Figure 1:
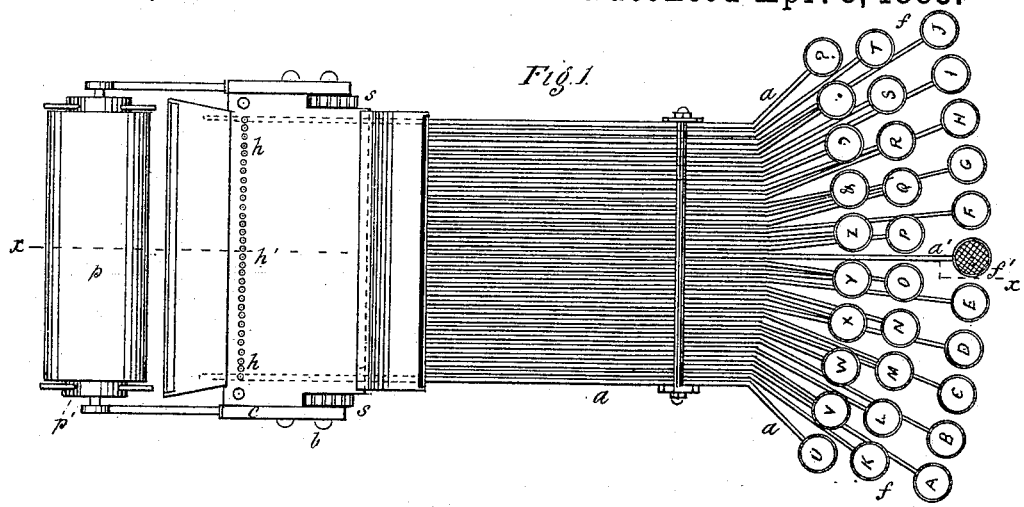

(No Model.)  A. F. & F. B. JOHNSON.  8 Sheets—Sheet 1.
AUTOMATIC PRINTING TELEGRAPH.

No. 275,339.  Patented Apr. 3, 1883.

Witnesses:
M. N. Epping
G. R. Riley

Inventors:
Albert F. Johnson,
Frank B. Johnson.
By their atty.
John S. Thornton

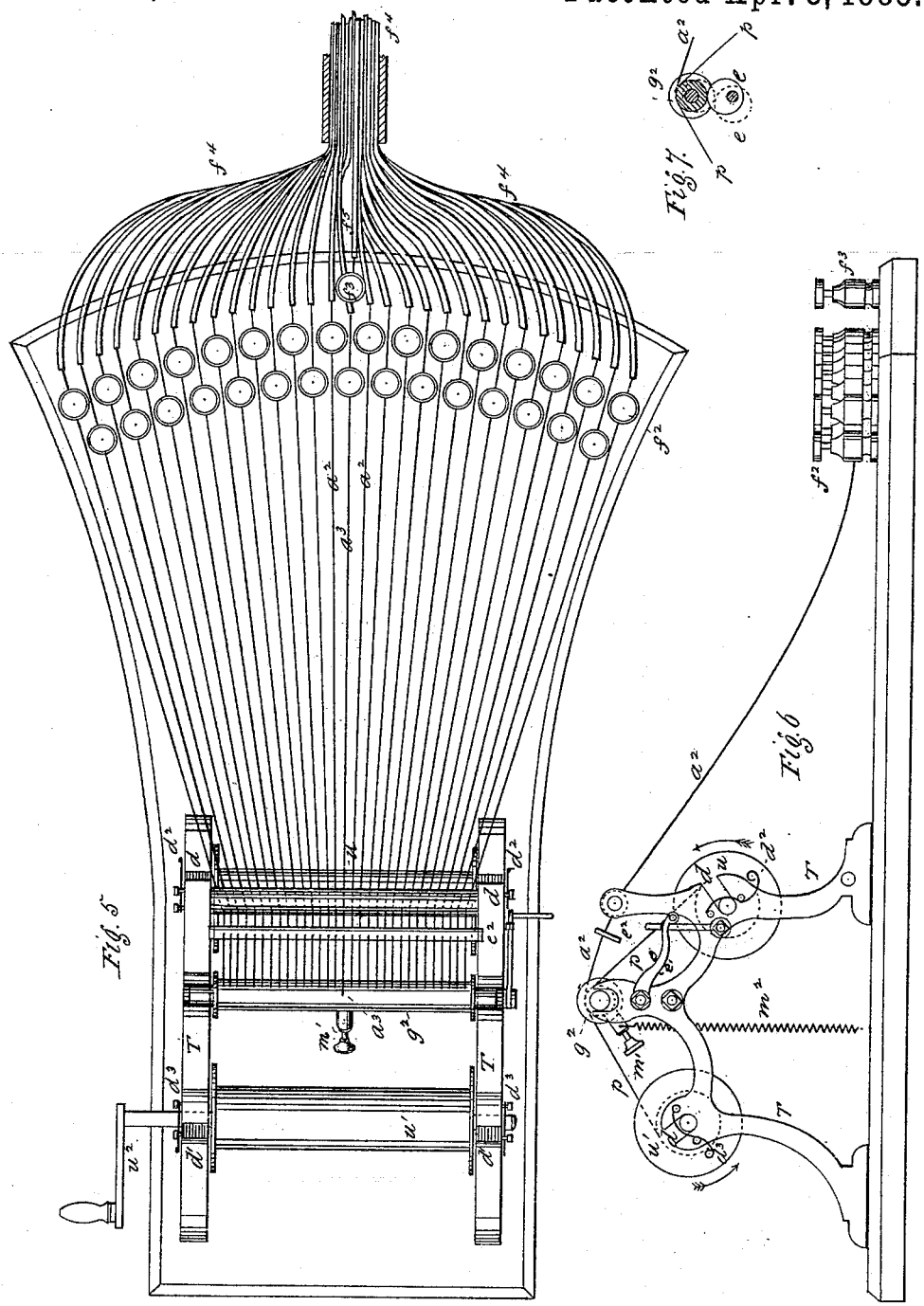

(No Model.)  8 Sheets—Sheet 3.

A. F. & F. B. JOHNSON.
AUTOMATIC PRINTING TELEGRAPH.

No. 275,339.  Patented Apr. 3, 1883.

Witnesses:
M. H. Jfping
G. R. Riley

Inventors:
Albert F. Johnson;
Frank B. Johnson.
By their atty.
John S. Thornton (No Model.)  8 Sheets—Sheet 4.
A. F. & F. B. JOHNSON.
AUTOMATIC PRINTING TELEGRAPH.
No. 275,339.  Patented Apr. 3, 1883.
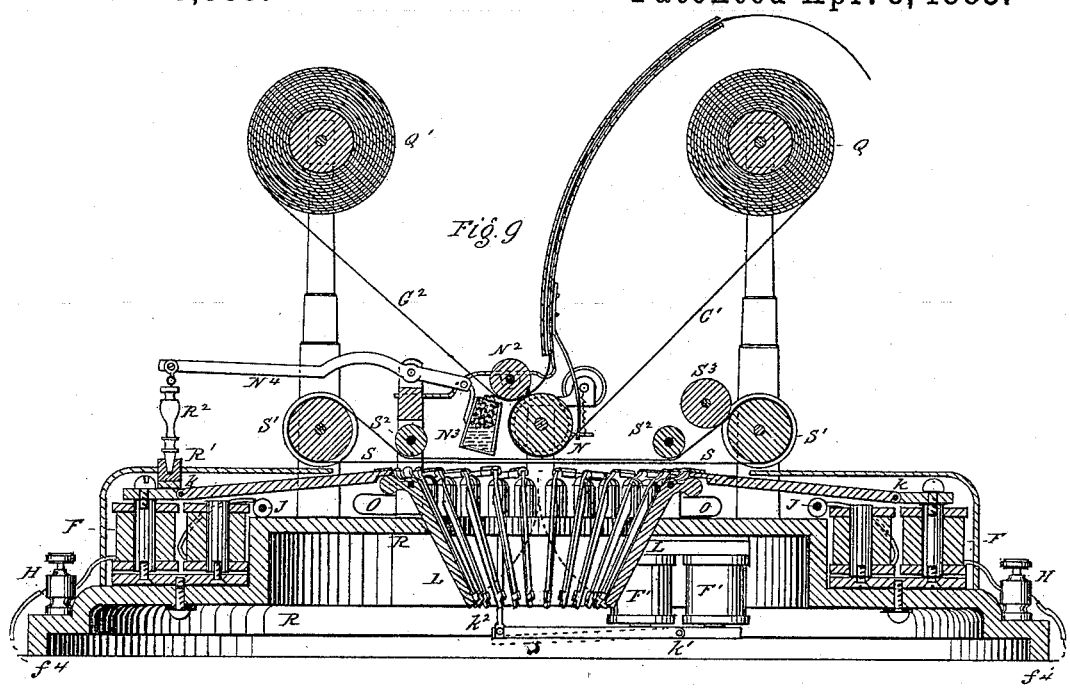
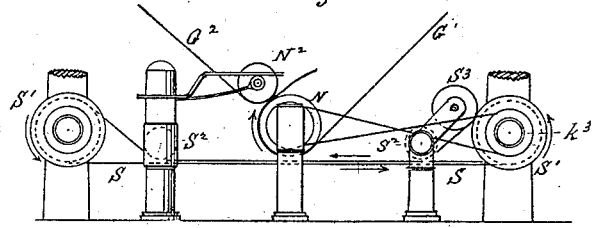
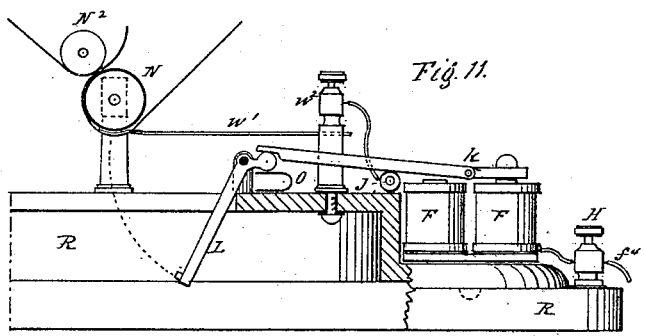
Witnesses
M. H. Epping
G. R. Riley
Inventors:
Albert F. Johnson,
Frank B. Johnson.
By their atty.
John S. Thornton
N. PETERS, Photo-Lithographer, Washington, D. C.

(No Model.)  8 Sheets—Sheet 5.
A. F. & F. B. JOHNSON.
AUTOMATIC PRINTING TELEGRAPH.
No. 275,339.  Patented Apr. 3, 1883.
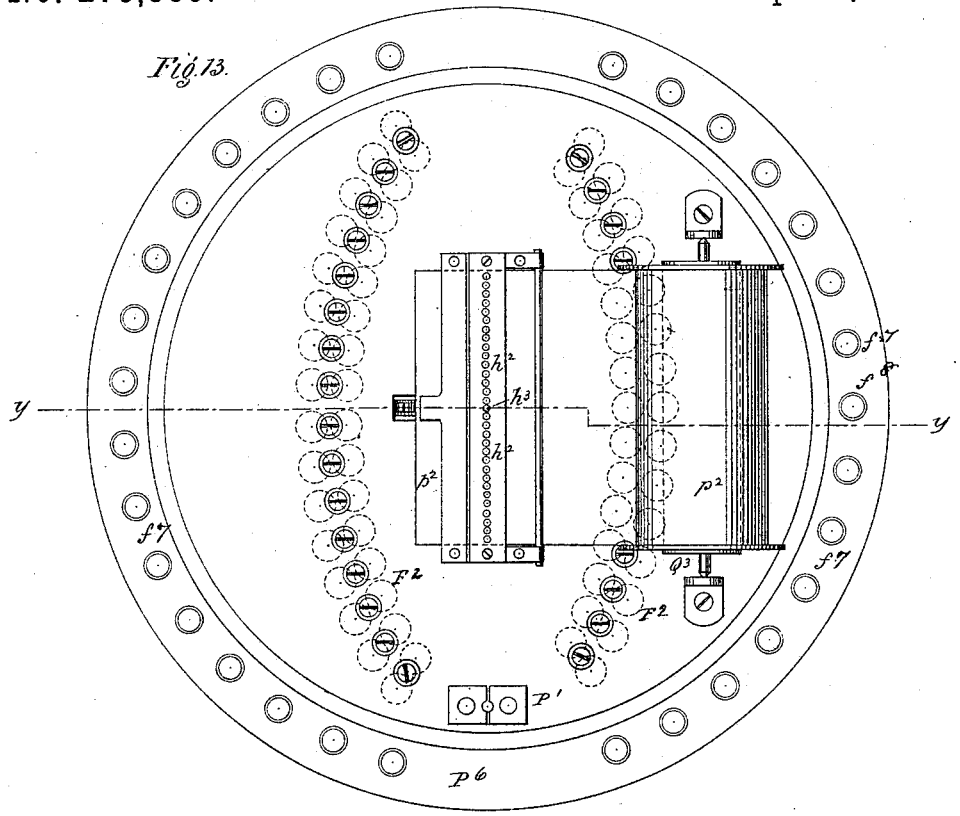
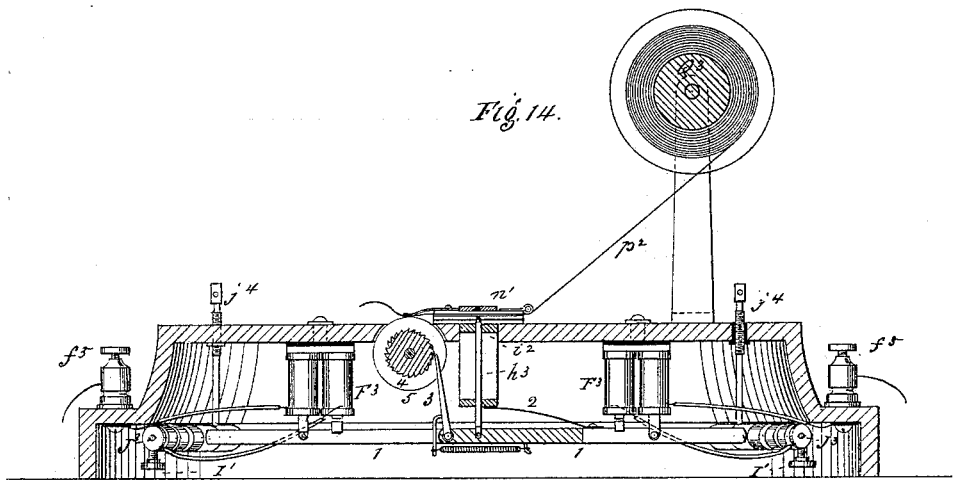

(No Model.)  8 Sheets—Sheet 6.
A. F. & F. B. JOHNSON.
AUTOMATIC PRINTING TELEGRAPH.
No. 275,339.  Patented Apr. 3, 1883.
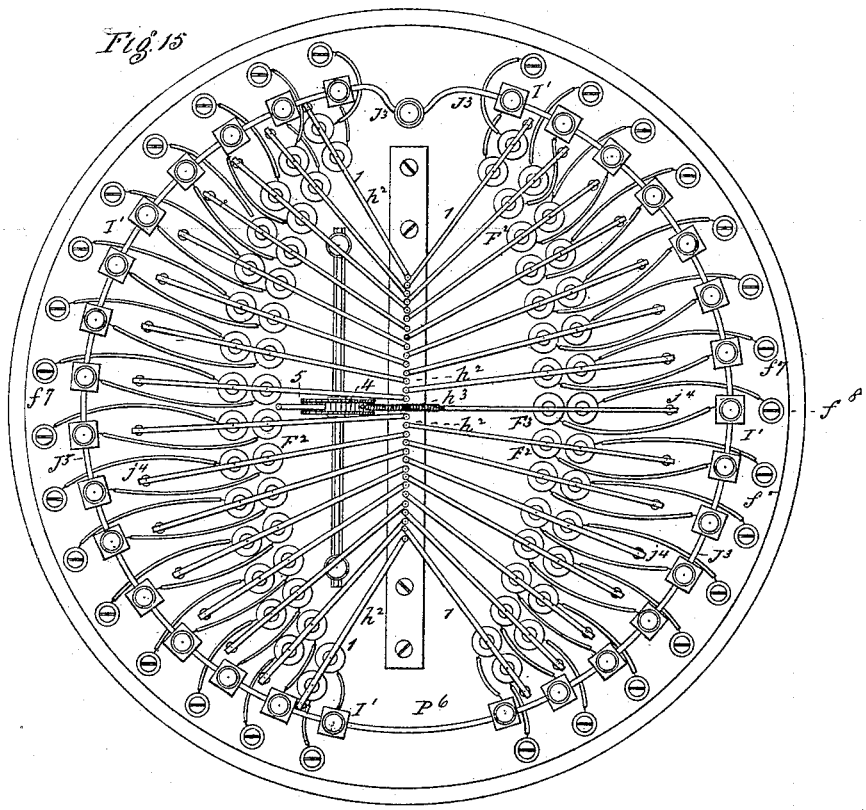
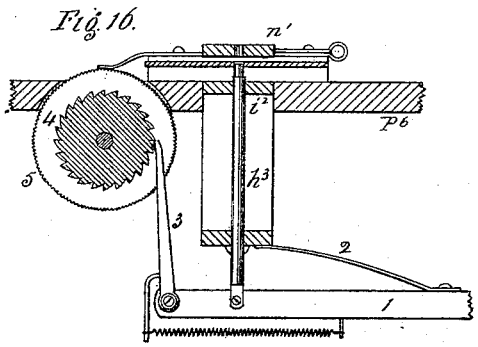
Witnesses:
M. H. Jeffries
G. R. Riley
Inventors.
Albert F. Johnson,
Frank B. Johnson.
By their Atty,
John S. Thornton (No Model.)

A. F. & F. B. JOHNSON.
AUTOMATIC PRINTING TELEGRAPH.

No. 275,339. Patented Apr. 3, 1883.

Witnesses:
M. H. Tippiey
G. R. Riley

Inventors:
Albert F. Johnson,
Frank B. Johnson.
By their atty.
John S. Thornton

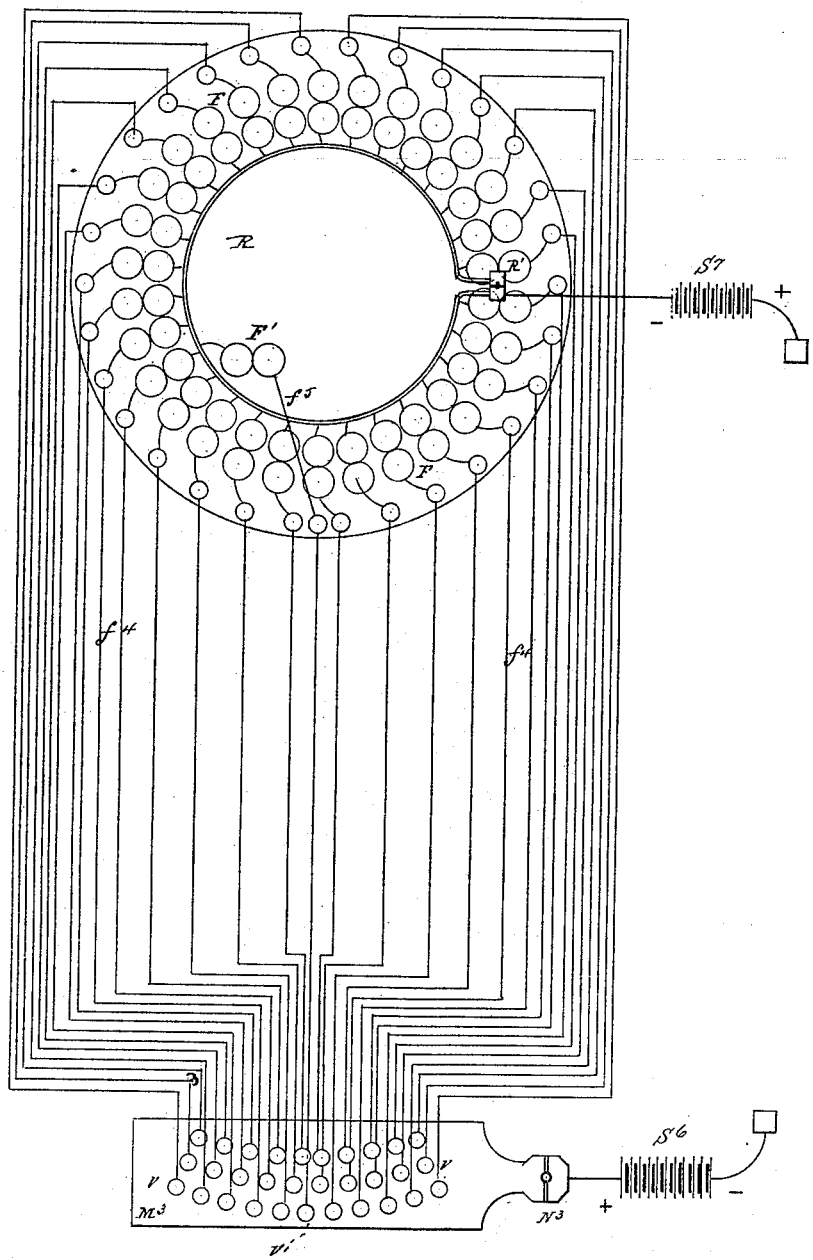

UNITED STATES PATENT OFFICE.

ALBERT F. JOHNSON AND FRANK B. JOHNSON, OF BROOKLYN, NEW YORK, ASSIGNORS TO THE JOHNSON MANUFACTURING COMPANY, OF SAME PLACE.

AUTOMATIC PRINTING-TELEGRAPH.

SPECIFICATION forming part of Letters Patent No. 275,339, dated April 3, 1883.

Application filed February 23, 1882. (No model.) Patented in England March 29, 1882; in Austria April 7, 1882; in France April 15, 1882; in Belgium, April 17, 1882, and in Germany April 18, 1882.

*To all whom it may concern:*

Be it known that we, ALBERT F. JOHNSON and FRANK B. JOHNSON, citizens of the United States, residing in the city of Brooklyn, in the county of Kings and State of New York, have jointly invented certain new and useful Improvements in Automatic Printing-Telegraphs; and we hereby declare the following to be a full, clear, and exact description thereof, reference being had to the accompanying drawings, (on eight sheets,) which form a part of this specification.

This invention relates to improvements in automatic printing-telegraphs by means of which said improvements messages can be transmitted very rapidly and with great economy in the item of salaries, as no skilled operators and but few employés are needed under our improved system. By this method a person can either prepare his message in his own office or home and send it by messenger to the nearest transmitting-station for transmission in an unintelligible form or he can, if his office is in communication by line-wires with the transmitting-station, operate from his own office an electric preparing-instrument, located at the transmitting-station, which is adapted to put his message into an unintelligible form for transmission, and in either case the message is printed under cover in typographical characters, and sealed up and addressed by the instrument at the receiving-station, ready for delivery to the person for whom it is intended. A person having frequent occasion for sending telegrams can therefore have his office connected by line-wires with a transmitting office or station, and by operating an instrument in his own office can prepare his message in the transmitting-office by means of electric impulses, thereby putting it into an unintelligible form for transmission, and thus save the time that would be consumed in sending it to the transmitting-office by messenger. In this system each letter and character has its corresponding magnet on the receiving-instrument, which is brought into circuit by the passage through the transmitting-instrument, of the perforation on the prepared message which represents said letter, and said magnet has connected with its armature a lever carrying a type of said letter, operated by each pulsation of the magnet to print said letter on a message-strip which is passed through said receiving-instrument. There is therefore a separate line-wire extending from the sending-station to the receiving-station for each letter or character used in sending messages, which said line-wires are insulated and are either carried through a tube extending from the sending-station to the receiving-station or twisted together to form a cable, and in either case are distributed at the receiving-station and each connected with its respective magnet on the receiving-instrument.

The invention consists in the improved constructions and combinations of mechanism and devices for automatically transmitting and printing telegraphic dispatches, as hereinafter described and specifically claimed.

Figure 2:
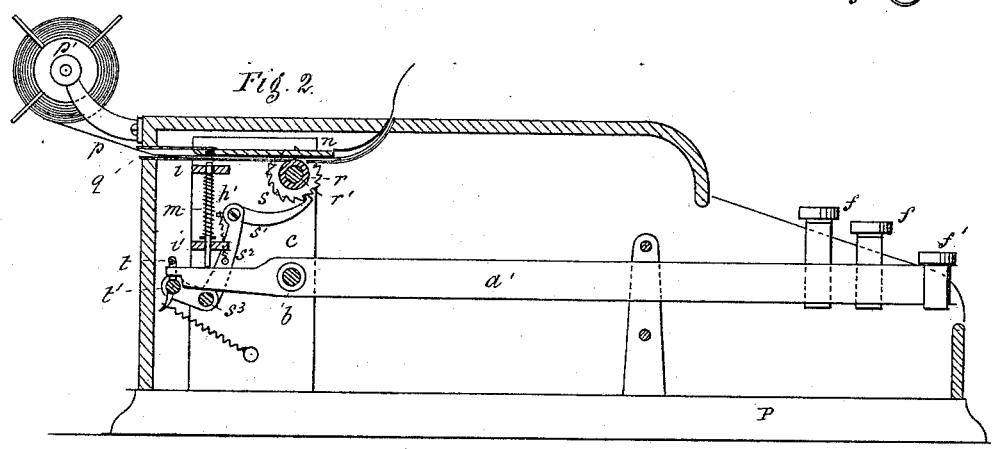
Figure 3:
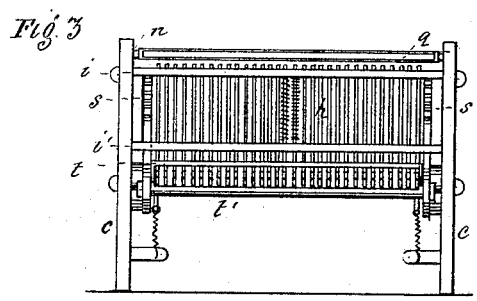
Figure 4:
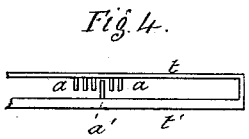
Figure 8:
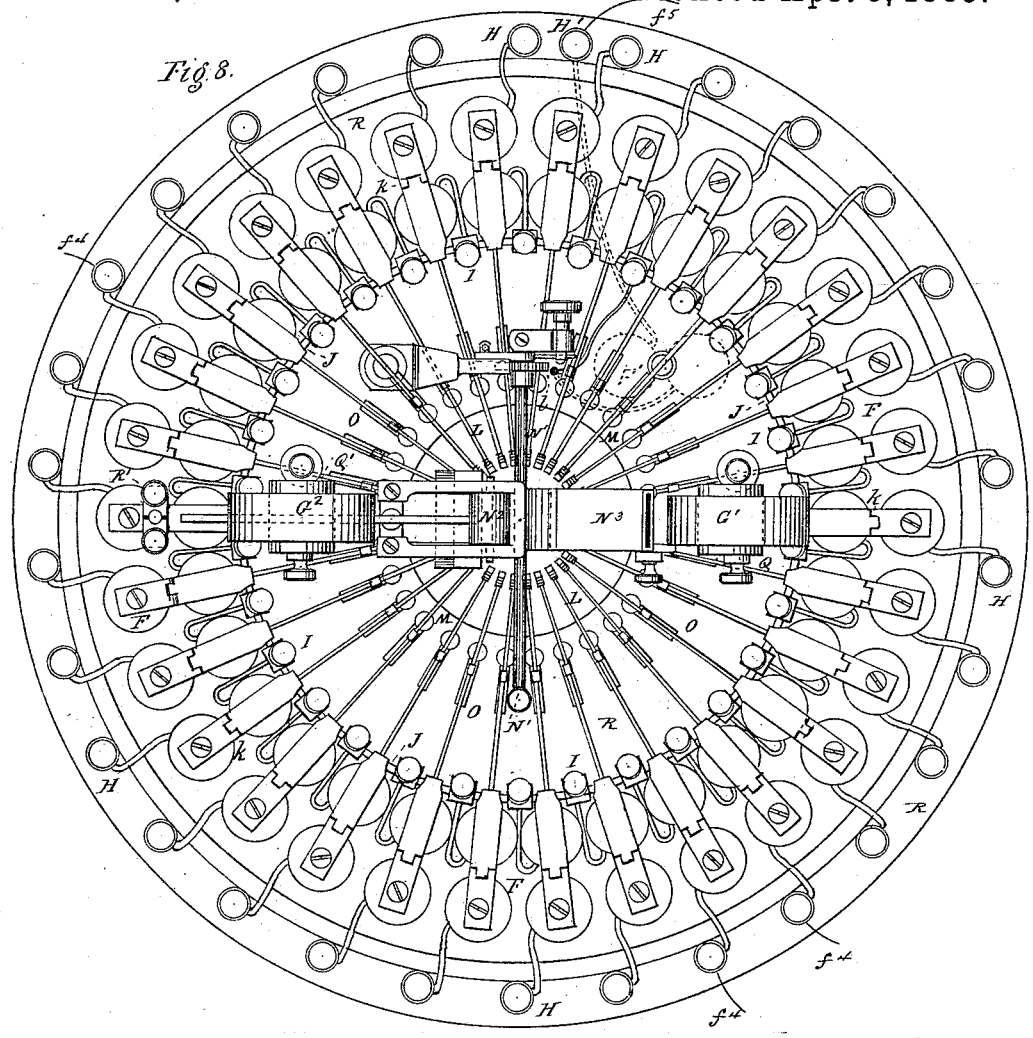
Figure 12:
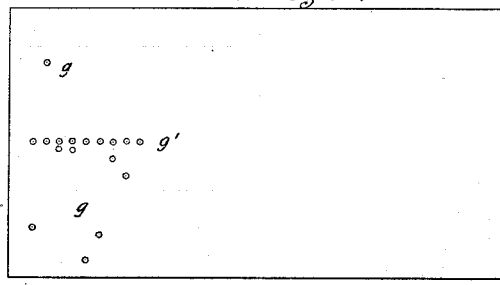
Figure 17:
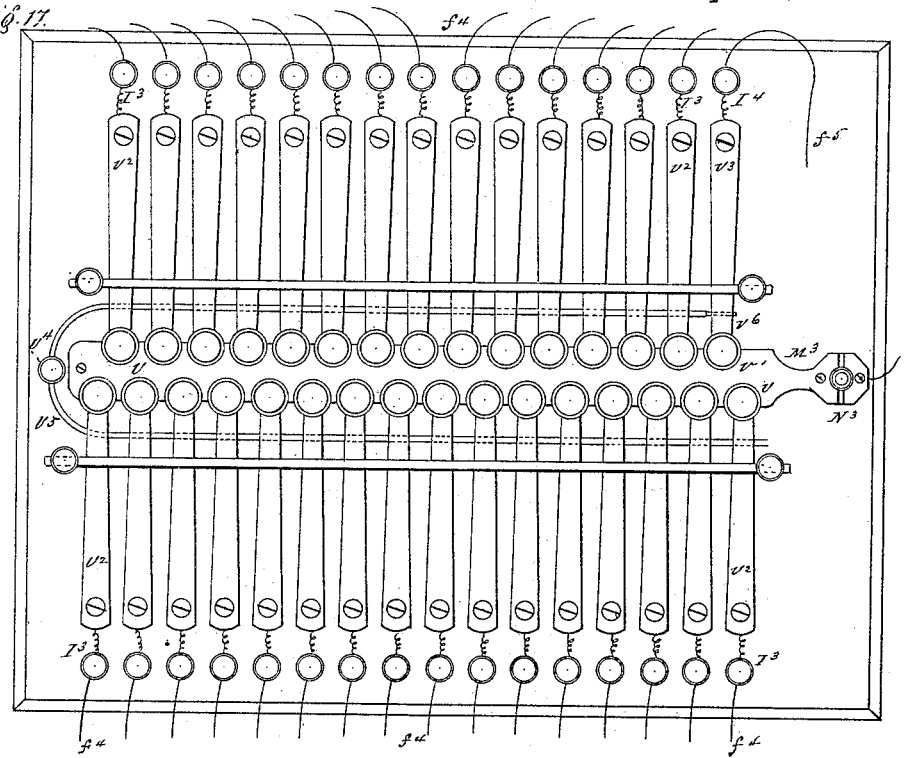
Figure 18:
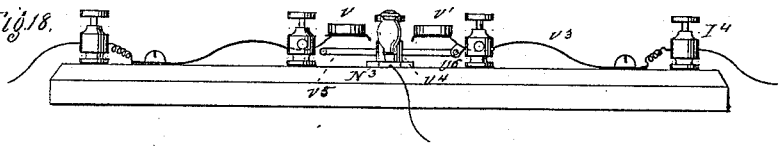
Figure 19:
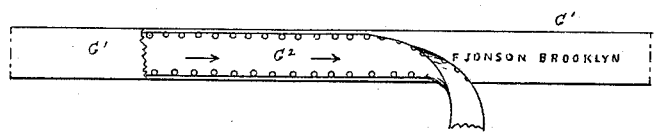

In the accompanying drawings on eight sheets, Figure 1 represents a plan view of the message-preparing instrument; Fig. 2 a side elevation, and Fig. 3 a partial end view, of the same. Fig. 4 is a detail, hereinafter explained. Fig. 5 is a plan view of the transmitting-instrument, and Fig. 6 a side elevation of the same. Fig. 7 is a detail, hereinafter explained. Fig. 8 is a plan view of the receiving-instrument; Fig. 9, a transverse section of the same on the line $xx$, and Figs. 10 and 11 are details, hereinafter explained. Fig. 12, Sheet No. 3, represents the perforated message. Fig. 13 is a plan view of the electric preparing-instrument, by means of which a message can be prepared at a distance; Fig. 14, a transverse section of the same on the line $yy$, and Fig. 15 a plan of the under side of the same, and Fig. 16, a detail hereinafter explained. Fig. 17 is a plan view, and Fig. 18 a side elevation, of the mechanism for operating said electric preparing-machine. Fig. 19 represents a portion of a message-strip, and Fig. 20 a diagram showing the electric circuits formed in the practice of our system.

Similar letters of reference indicate the same parts in all the several figures.

The message is printed on the message-strip in the receiver in one continuous line, with proper intervals between letters and words.

We shall first describe the method or process of preparing a message by hand to be transmitted, and the mechanism by which this is accomplished. In this case the author of the message prepares his message in his own office or elsewhere, and then sends it to the nearest transmitting-station for transmission, and for this purpose the instrument shown in Figs. 1, 2, 3, and 4 is used. We do not, however, in this application claim the construction of this perforator, as the same has been described and claimed by us in a separate application, and we here describe the same merely for the purpose of showing more clearly the mode of preparing the message for transmission in an unintelligible form.

$a$ represents a series of levers arranged side by side and fulcrumed on a transverse bar, $b$, secured at each end to the sides of an upright frame secured to the base P. $a'$ is a lever, similarly fulcrumed. At the outer end of each of said levers $a$ is a press button or knob, $f$, each marked with one of the letters of the alphabet or such other characters as are employed in transmitting the messages. The lever $a'$ also has a similar knob, $f'$, but without any letter or character marked on it. The drawings show thirty-one of these levers; but the number may be increased if it is desired to employ additional characters—as, for instance, numerals.

$h\ h'$ represent a series of punching-rods corresponding in number with the said levers, and each operated by one of said levers, the rod $h'$ being operated by the lever $a'$. These rods are fitted between transverse horizontal plates $i\ i'$, having perforations to receive them, and each of them is pivoted to one of said levers, or else arranged so that its lower end rests upon its respective lever when in its normal position, and is raised to perforate the paper whenever the knob $f$ of such lever is depressed. Retracting-springs $m$ are fitted on said rods between the plates $i\ i'$ for the purpose of bringing the levers into their normal position when the pressure on the knob is removed. Above the plate $i$ and parallel therewith is another plate, $n$, having a series of perforations each directly over the upper end of one of said rods, and between these plates $i$ and $n$ the paper $p$ to be perforated is passed from a reel, $p'$, located in any suitable position, so that when one of the knobs $f$ is depressed the rod operated by such knob makes a perforation in the paper.

$q$ is a thin perforated plate, running parallel with and between the plates $i$ and $n$ for the purpose of stripping the paper from the rods when a perforation has been made.

$r$ is a feed-roller having a roughened or friction surface, which presses against the under surface of the plate $n$, (the paper $p$ passing between them,) and which is fixed upon a shaft, $r'$, having bearings in the sides $c$ of the frame.

This roller $r$ is driven by means of ratchet-wheels $s$, fixed upon the ends of said shaft $r'$, which are operated by pawls $s'$, pivoted to the upper ends of bent levers $s^2$, that are fulcrumed on a transverse bar, $s^3$.

To the lower ends of the bent levers $s^2$ are secured two parallel transverse bars, $t\ t'$, between which the ends of the levers $a\ a'$ extend, so that whenever one of the knobs $f$ or $f'$ is struck the pawls $s'$ are thrown forward to make a stroke, and the stroke is made by the return of the levers $a$ or $a'$ to their normal position by the action of the springs $m$. These pawls are arranged to make a longer stroke than is necessary merely to engage with each tooth of the ratchets $s$, so that the rods $h\ h'$ will have descended a sufficient distance to clear themselves from the paper before the latter is moved forward by the pawl engaging with the ratchet-tooth. Whenever one of the rods $h$ is raised by pressing the knob by which it is operated the rod $h$ is also raised, and each rod makes a perforation in the paper, the former for printing the letter on the message-strip in the receiver, and the latter for moving said message-strip forward to receive the next letter printed.

The device employed for causing the rod $h'$ to make a perforation simultaneously with each of the rods $h$ is shown in Fig. 4, and is as follows: Each of the levers $a$ rests, when in its normal position, with the upper surface of its end in contact with the under surface of the bar $t$, and the lever $a'$ similarly rests with its lower surface in contact with the upper surface of the bar $t'$, so that whenever one of the levers $a$ is struck it raises said bars $t$ and $t'$, and thereby also raises the rear end of $a'$, and the rod $h'$ is thereby raised to make a perforation. It will be understood that the rod $h'$ can be operated independently of the rods $h$, and is raised by depressing $f'$ once between each word, and a number of times between the subject-matter of the message and the address, so as to leave a suitable space between the two in the message-strip G'.

The operation in preparing a message is as follows, viz: The end of the paper $p$ having been passed between the plates $q$ and $n$ and between the latter and the feed-roller $r$, the knob $f$, which has upon it the first letter in the message to be sent, is depressed. A perforation representing that letter is thereby made, together with another perforation made by the rod $h'$ for the purpose of moving forward the message-strip, as above mentioned. Each stroke of any of the levers $a\ a'$ operates the feed-roller $r$ and moves forward the paper $p$ to receive the next perforation. This being done, the knob bearing the next letter in the message is struck, and so on until the end of the word is reached, and then the knob $f'$ is depressed once for the purpose above mentioned. At the end of the message the knob $f'$ is depressed a sufficient number of times to leave a suitable space on the message-strip G' between the message and the address, and then the knobs are pressed, as before, to make perforations representing the several letters in the address. A portion of a perforated message is shown in Fig. 12, Sheet 3, having perforations $g$, which cause the receiver to print the word "Brooklyn" and a central line of perforations made by the rod $h'$ to move forward the message-strip $G'$ while the several letters of said word are being printed. The message thus prepared, by putting it into a form which is unintelligible on inspection, may be sent to the nearest station having one of our improved transmitters in circuit with the receiving-instrument at the station where the message is to be printed for delivery, and from thence sent to its destination.

The transmitting-instrument is shown on Sheet No. 2 by Figs. 5 and 6. In said figures, $a^2$ represents a series of metallic wire rods, connected at one end by means of a series of binding-posts, $f^2$, with line-wires $f^4$, which extend from the sending-station to the receiving-station, each connecting with a separate magnet on the receiver. $a^3$ is a similar wire rod, connected by the binding-post $f^3$ with a line-wire, $f^5$, which runs to the magnet on the receiver that operates the mechanism for feeding forward the message-strip $G'$. The opposite ends of these rods $a^2$ $a^3$ rest upon an insulated metallic roller, $g^2$, at a distance apart, as nearly as possible, equal to the distance between the punching-rods of the preparing-instrument above described. When the message is to be transmitted the perforated paper $p$ is secured to and wound upon a roller, $u$, under the ends of the wire rods $a^2$ $a^3$, and its end passed over the roller $g^2$ and thence to a roller, $u'$, to which it is secured, and which is turned by a crank, $u^2$. The several lines of perforations $g$, each line representing a particular letter or character, pass under the ends of the wires $a^2$ $a^3$ as the paper is passed over the roller $g^2$ by winding it from the roller $u$ to $u'$, and whenever one of the perforations comes under its corresponding wire metallic contact is made between said wire and the roller $g^2$. The central wire, $a^3$, coincides with the perforations $g'$ made by the rod $h'$, and is connected by its line-wire $f^5$ with the magnet on the receiver that operates the feed mechanism in the latter. This wire $a^3$ is slightly longer than the others, so that the perforation which closes the circuit to print the letter takes effect first, after which the central perforation, $g'$, closes its circuit to move forward the message-strip. A binding-screw, $m'$, carries a wire, $m^2$, which connects the metal roller $g^2$ with the battery at the sending-station, said battery having a ground-wire from its opposite pole. Each magnet in the receiver is connected with the battery at the receiving-station and thence with the ground, so that whenever one of the perforations on the paper $p$ passes under one of the rods $a^2$ $a^3$ it makes contact with the roller $g^2$, and an electric impulse is transmitted along its line-wire to the magnet on the receiver that prints the particular letter represented by such perforation.

The rollers $u'$ and $u$ may be of suitable diameter, so that the paper shall be evenly wound from one to the other, and they have bearings in the frame T, being let into slots $d$ $d'$ in the latter and held by springs $d^2$ and $d^3$, or secured therein by other suitable means. The roller $g^2$ also has bearings in the frame T, and, when in position for work, it bears on two eccentrics, $e$ $e$, which are lifted by a crank or lever, $e'$, thereby stretching the paper $p$ over the roller $g^2$, and bringing the line-wires into connection with the battery-wire, and are lowered when the paper is being put in. These eccentrics are shown in Fig. 7.

$e^2$ is a guide-bar, through which the wires $a^2$ $a^3$ are passed to hold them in proper position. The said wires are made from spring-wire to insure their resting firmly on the paper while the body of the same is passing under them, and on the roller $g^2$ when a perforation passes under them. As before stated, the line-wires $f^4$ $f^5$ are either twisted into a cable or are carried through a tube, and thus extend from the sending-station to the receiving-station and there distributed and each connected with its corresponding magnet.

The receiving-instrument is shown in Figs. 8, 9, 10, and 11. In said figures F F represent a series of magnets, one coil of each of which is connected with the transmitting-instrument by one of the line-wires $f^4$, previously mentioned, by means of the binding-posts H; and its other coil is connected with the battery at the receiving-station and thence with the earth, through the medium of binding-screws I, fitted upon a copper ring, J. The armatures of these magnets are hinged, as shown at $k$, and their inner ends are prolonged and rest upon the upper ends of pivoted bent levers L, the lower end of each of which carries a printing-type of the particular letter or character represented by the perforation $g$, that transmits the electric impulse over the line-wire of such magnet. These levers L are pivoted to uprights M and radially arranged, so that the types on their lower ends shall strike on one point whenever their upper ends are depressed by the attraction of the armatures of the respective magnets which operate them, that point being the under side of the message-strip $G'$ as it passes over the under surface of the feed-roller N, and they are retracted by suitable springs, O, and thus brought into their normal position when the attraction ceases. The feed-roller N is fixed upon a shaft, N', having bearings in uprights secured to the base R, and the message-strip $G'$ passes over its under surface from a reel, Q, supported in any suitable position, and is carried from thence between said feed-roller N and a friction-roller, $N^2$, and thence through a tube or other suitable conductor, $N^3$, to any convenient point. F' is a magnet, one coil of which is connected with the line-wire $f^5$ by means of the binding-post H', its other coil being connected by means of one of the binding-screws I with the copper ring J, and thence with the battery at the receiving-station. The armature of this magnet is hinged, as at $k'$, and to its inner prolonged end is pivoted an upright rod, $k^2$, the upper end of which is provided with a pawl that rotates a ratchet-wheel, $l$, fixed upon the end of the shaft N', so that the feed-roller N is moved forward by each stroke of said armature for the purpose of leaving spaces between the letters and words on the message, and at the end of the subject of the message to leave the space previously mentioned between the message and the address. An inking-ribbon, S, in the form of an endless band, is interposed between the message-strip G' and the types on the levers L, said ribbon being stretched over rollers S' S' and $S^2$ $S^2$. $S^3$ represents an inking-roller for applying the ink. A pulley, $k^3$, (see Fig. 10,) is provided on the end of one of the rollers S', which is driven by a belt from a similar pulley on the feed-roller N, for the purpose of giving motion to said inking-ribbon. The ring J is divided at any convenient point, and the ends of the same connected with the sections of a switch, R', and from thence with the battery and the earth for the purpose of throwing the receiver into or out of circuit with the sending station, so that when a message is to be received and printed, the plug $R^2$ is inserted to bring said receiver into circuit with the transmitter at the sending-station, and when said plug is removed the currents pass on to the next station having its receiver in circuit with the sending-station.

In order to keep the message secret, a second strip, $G^2$, is sealed over the message-strip by means of the following-described devices. Said second strip $G^2$ passes from a reel, Q', and thence between the friction-roller $N^2$ and the message-strip G' as the latter passes over the feed-roller N. A cup, $N^3$, containing a moistened sponge arranged to dampen the under side of the edges of the strip $G^2$ before the latter passes between said rollers, is suspended from a lever, $N^4$, pivoted to any suitable support, to the other end of which said lever the plug $R^2$ is pivoted in such manner that whenever said plug is inserted in the switch R' said sponge will be in contact with the edges of the strip $G^2$, as shown, and the edges of the message-strip G' having been previously gummed, the two strips are sealed together as they pass between the rollers N and $N^2$ with the printing between them. By these means whenever the circuits are closed by the insertion of the plug $R^2$ to receive a message the cup $N^3$ will be in position to seal the strips together.

We may state that all the magnets and binding-posts and other parts through which the currents pass are insulated from the base R and from the other parts of the instrument.

As the address is printed in the same manner as the subject-matter of the message it is evident that it will be concealed by the second strip $G^2$, and consequently it is necessary that provision be made for ascertaining the address without the subject of the message being revealed to the person in charge of the receiver. This may be accomplished as follows: For said strip $G^2$ we use a very thin dark-colored paper, such color admitting of the use of a thin paper without the printing being visible through it. The portion of the strip $G^2$ that covers the address is removed after the message is taken from the receiver without disturbing that portion of the same which covers the message proper; and the means employed for indicating which particular part of the strip $G^2$ shall be removed without uncovering the message proper is as follows: A number of arrows or similar marks are printed on the strip $G^2$ previous to its being placed in the instrument, for the purpose of indicating in which direction the message is printed, so that the person in charge of the instrument may know from which end to remove said second strip, $G^2$, to ascertain the address, and he removes the same as far as the blank space between the message and the address, to uncover the latter. The strip $G^2$ may be perforated at its edges, if desired, for the purpose of facilitating its removal.

A plan view of a portion of a printed message-strip is shown in Fig. 19, Sheet No. 7. Whenever a message is to be sent to a station not in circuit with the sending-station, our electric preparing-instrument is employed for reproducing the prepared message at some station which is in circuit with the sending-station and the receiving-station; or, if there is no station in circuit with both, then the message is successively reproduced until it reaches a station which is in circuit with that at which the message is to be received and delivered. This instrument is shown in Figs. 13, 14, and 15. It is provided with a set of punching-rods, $h^2$ and $h^3$, corresponding with those in the preparing-instrument previously described, which are placed in the same relative position—that is to say, each of them makes a perforation to represent the same letter or character as its corresponding perforation in the original perforated strip represents—so that when the message prepared by this instrument is passed through one of the transmitters it will close the same circuits and in the same order that the original would have closed if it had been passed through the same transmitter. These rods $h^2$ $h^3$ are pivoted at the ends of levers 1, which form the armatures of the magnets $F^2$ and $F^3$, and whenever one of said armatures is attracted by its magnet, the rod pivoted to its end is raised and makes a perforation on the paper $p^2$. Said armatures are pivoted, as shown, to the outer coils of the magnets.

The paper $p^2$, on which the message is to be perforated, is held on a reel, $Q^3$, and from thence passed between the perforated plates $n'$ and $i^2$, which said plates correspond with the plates $n$ and $i$, before described. One coil of each of said magnets is connected by means of the binding-posts $f^7$ and $f^8$ with a line-wire extending to the sending-station, and its other coil is connected with a local battery through the medium of a copper ring, $J^3$, and binding-screws $I'$. The levers are retracted by springs 2, and their throw adjusted by means of set-screws $j^4$. The central lever is prolonged, and at its end is pivoted a pawl, 3, which rotates a ratchet-wheel, 4, fixed upon the same shaft as is a feed-roller, 5, for feeding the paper along to receive the perforations. The rod $h^3$, operated by this central lever through the medium of the magnet $F^3$, answers to the rod $h'$, hereinbefore described, and makes perforations $g'$, which operate the feed mechanism of the receiving-instrument, as well as to feed forward the paper $p^2$, as just described. $P'$ is a switch connected with the local battery and the earth. The ring $J^3$ is divided and its ends connected respectively with the two sections of the switch $P'$, so that the instrument can be thrown into or out of circuit at pleasure. The parts above described are all insulated from the base $P^6$, and also properly insulated from each other.

We may here state that we do not deem it necessary to particularly indicate the points where the parts are insulated either in this instrument or the other instruments herein described, as the necessity for such insulation will be readily apparent to any one skilled in the art.

This electric preparing-instrument, in addition to its employment for reproducing a prepared message, may, as hereinbefore mentioned, be used for preparing a message at a distance—as, for instance, a person may perforate or prepare his message in the telegraph-office while in his own office or home. The mechanism for effecting this is shown in Figs. 17 and 18, and consists of a key-board or set of press-buttons, $v\ v'$, similar to those on the preparing-machine first described, and each button or knob $v\ v'$, when depressed, operates to make a perforation (at the distant point) which is the exact counterpart in position and purpose with the perforation made by pressing the corresponding knob in the said preparing-machine. The knobs $v\ v'$ are fixed upon the ends of spring-bars $v^2\ v^3$, which are connected with line-wires extending to the station where the electric preparer is located, and connected respectively with the several magnets $F^2$ and $F^3$ on the latter through the medium of said spring-bars and the binding-posts $I^3\ I^4$, and whenever any one of said knobs is depressed it makes metallic contact with a metal plate, $M^3$, one end of which terminates in a switch, $N^3$, and is connected with a local battery. The knob $v'$ is connected with the line-wire, which is connected to the magnet $F^3$, that operates to make the perforations for feeding the message-strip forward in the receiver, and it is arranged to make contact with the plate $M^3$ whenever any one of the knobs $v$ is depressed. This may be accomplished by means of a spring-wire, $v^5$, secured in a binding-post, $v^4$, which said wire extends under each line of knobs $v$, but out of contact with them until they are depressed, and terminates in a projection, $v^6$, on the under side of the spring-bar that carries the knob $v'$, as shown in Fig. 18, so that when one of the knobs $v$ is depressed it strikes the wire $v^5$, and thereby causes the knob $v'$ to make contact with said plate $M^3$ and thus brings the magnet $F^3$ into circuit.

From the above description it will be seen that by fingering this key-board a prepared or perforated message is produced that is the exact counterpart of the one that would be produced on the hand preparing-instrument if fingered in the same manner.

We may here state that a person having frequent necessity for sending telegrams may have one of these key-boards in his office connected by line-wires with the nearest station having a transmitter, and thus while in his office be enabled to prepare his messages at such transmitting-station by putting them into unintelligible form for transmission, and it is obvious that by means of our improvements telegraphic communications can be made very rapidly, as well as with secrecy, and that comparatively few employés and no skilled operators are needed.

If desired, the messages may be printed by the receiver on sensitized paper, instead of being printed with ink. For this purpose the modification shown in Fig. 11 may be employed, the inking-ribbon and inking-roller being dispensed with. The feed-roller $N$ and friction-roller $N^2$, together with the other parts of the receiver, previously described, remain in the same positions and are operated in the same manner as before. The message-strip $G'$ is sensitized by any of the well-known processes, and, instead of being directly in contact with the under side of the feed-roller, a thin metallic plate, $w'$, is interposed. This plate is secured to an insulated binding-post, $w^2$, connected with the battery-wire. The magnets $F$ are arranged as previously described, and hence when one of them is brought into circuit the type on its lever $L$ strikes the message-strip as it is stretched over the plate $w'$ and makes the impression, it being understood that the upright to which the lever $L$ is pivoted and the retracting-spring $O$ are both insulated. In this case the feed-roller $N$ is covered with soft rubber, for the double purpose of insulating it and providing a yielding surface.

We do not confine ourselves to the specific constructions of mechanisms hereinbefore described, as it is obvious that modifications may be made in such constructions in each of the instruments without departing from the principles of our invention; and we do not in this application claim the construction of the electrically-operated perforator shown by Figs. 13, 14, 15, and 16, nor that of the receiver shown by Figs. 8, 9, 10, and 11, as these have been described and claimed in separate applications for patents. Neither do we hereby claim the key-board shown in Figs. 17 and 18, as the construction of the same and its combination with parts of the mechanisms herein described will form the subjects of a separate application, and it is introduced herein only for the purpose of more clearly defining the invention covered hereby.

We are aware that a strip or fillet of paper for automatic telegraphing has been perforated by means of electric impulses, as shown in the patent to Thomas A. Edison, dated August 12, 1873, and numbered 141,775, and therefore we do not claim that, broadly, and in that case the perforator was for the purpose merely of making the manipulation easier for the operator, and the mechanism was employed at the place where the perforations were made, whereas our electric perforator is operated at a distance to save time and expense, and also for the purpose of reproducing a prepared message for further transmission, and by mechanism which is essentially different from that described in said patent.

On Sheet No. 8, Fig. 20, is shown a diagram of electric circuits formed in the practical working of our system. Said circuits are essentially similar between the transmitter and receiver, the key-board and the electric perforator, and the key-board and receiver, and therefore for the sake of simplifying the description and avoiding repetition we have shown the key-board and an outline plan of the receiver for this purpose. As will be seen, each line-wire runs to a separate magnet on the receiver, and said magnet prints the particular letter marked on the knob or press-button which brings it into circuit.

$S^6$ represents the battery at the sending-station and $S^7$ the battery at the receiving-station, and as the circuits may be readily traced it is not deemed necessary to further extend this description, further than to say that the press-buttons are differently disposed for the purpose of showing the line-wires more clearly.

What we claim as our invention is—

In a system of mechanism for automatically transmitting, receiving, and printing telegraphic dispatches, the combination, as shown and described, of the following parts, viz: a strip of paper or similar material, $p$, on which the message to be sent is perforated in several lines or series, $g$, of perforations, each series representing one particular letter or character, and on which is perforated a separate series, $g'$, for operating the feed mechanism of the receiving-instrument, a transmitting-instrument (shown in Figs. 5 and 6) having a separate circuit-closer for each kind of letter or character employed, and another circuit-closer for operating the feed mechanism of the receiving-instrument, said transmitting-instrument being constructed as described, and its circuit-closers adapted to be operated by said perforated strip in the manner specified, a receiving-instrument having a series of separate electro-magnets, F, each of which is connected by a line-wire, $f^4$, with said transmitter, and provided with devices, as described, to print one particular letter or character on a message-strip therein, and having another separate electro-magnet, F′, connected by line-wire $f^5$ with said transmitter, and provided with mechanism, as described, to feed forward said message-strip, and battery-wires, substantially as described, forming properly-arranged electric circuits between said transmitting and receiving instruments, the whole being constructed to operate in the manner described, for the purpose set forth.

ALBERT F. JOHNSON.
FRANK B. JOHNSON.

Witnesses:
JOHN S. THORNTON,
M. H. TOPPING.